(12) United States Patent
Benensohn

(10) Patent No.: US 6,700,331 B2
(45) Date of Patent: Mar. 2, 2004

(54) CONTROL CIRCUIT FOR DIMMING FLUORESCENT LAMPS

(75) Inventor: Sanford H. Benensohn, Valencia, CA (US)

(73) Assignee: Lusa Lighting, Inc., Valencia, CA (US)

( * ) Notice: Subject to any disclaimer, the term of this patent is extended or adjusted under 35 U.S.C. 154(b) by 0 days.

(21) Appl. No.: 10/162,447

(22) Filed: Jun. 5, 2002

(65) Prior Publication Data
US 2003/0227263 A1 Dec. 11, 2003

(51) Int. Cl.[7] .............................. H05B 41/24; G05F 1/00
(52) U.S. Cl. ......................................... 315/224; 315/309
(58) Field of Search ................................. 315/225, 224, 315/307, 309, 291, 209 R, 241 R, DIG. 5, DIG. 7, 308

(56) References Cited

U.S. PATENT DOCUMENTS

| 32,953 A | * | 7/1861 | Nilssen ..................... 126/21 R |
| 4,554,487 A | * | 11/1985 | Nilssen ........................ 315/224 |
| 4,700,287 A | * | 10/1987 | Nilssen ........................ 363/132 |
| 4,926,096 A | * | 5/1990 | Nilssen ........................ 315/225 |
| 4,949,015 A | * | 8/1990 | Nilssen .................... 315/200 R |
| 5,004,955 A | * | 4/1991 | Nilssen ........................ 315/119 |
| 5,710,489 A | * | 1/1998 | Nilssen ........................ 315/309 |
| 5,714,846 A | * | 2/1998 | Rasch et al. ................. 315/225 |
| 5,825,136 A | * | 10/1998 | Rudolph ....................... 315/291 |

* cited by examiner

Primary Examiner—Don Wong
Assistant Examiner—Chuc Tran
(74) Attorney, Agent, or Firm—Michael A. Painter

(57) ABSTRACT

The present invention constitutes a control circuit which permits the dimming of the illumination emitted from a fluorescent lamp. A controllable source of alternating current power is converted to direct current utilizing a conventional diode bridge and power filter. The direct current signal is converted to a high frequency alternating current signal using a self-oscillating inverter circuit. The output of the inverter circuit is coupled to a resonance circuit. The lamp will be turned on when the output of the resonance circuit is increased until it exceeds the minimum voltage specified for the selected fluorescent lamp. A voltage doubler circuit powers the fluorescent lamp and permits the fluorescent lamp to be dimmed or otherwise remain illuminated when the input alternating power is reduced below that specified for normal operation of the fluorescent lamp.

6 Claims, 3 Drawing Sheets

CONTROL CIRCUIT FOR DIMMING FLUORESCENT LAMPS

BACKGROUND OF THE INVENTION

1. Field of the Invention

The present invention generally relates to the field of control circuits used to power fluorescent lamps and in particular to those circuits which permit the illumination of a fluorescent lamp to be dimmed in response to a reduction in input power.

2. Prior Art

In order for a fluorescent lamp to illuminate, the voltage across the filaments thereof must be greater than the minimum voltage specified for the lamp. Under typical conditions, it is necessary for a lamp supply circuit to include a current limiting element. The fluorescent lamp itself acts as a voltage limiting component. The voltage across the filaments of a fluorescent lamp is independent of the power supply voltage and is determined by the power of the fluorescent lamp itself. Therefore, to illuminate a fluorescent lamp with conventional alternating current power (i.e., 115 volts/60 Hz), a ballast or current limiting component is utilized.

To turn on or illuminate a fluorescent lamp, it is necessary to utilize a triggering or starting component. This is generally referred to as a starter circuit which initially heats the filaments of the fluorescent lamp. The lamp is illuminated when the voltage across the filaments exceeds the minimum necessary for a particular fluorescent lamp. The prior art exhibits several basic circuits for powering fluorescent lamps. One of the conventional designs for a fluorescent lamp power supply circuit is shown in FIG. 1.

A fluorescent lamp 10 is a gas discharge tube, the inner surface of which is coated with a light-emitting substance, typically fluorescent or phosphorescent metallic salts (e.g., calcium tungstate, zinc sulphide or zinc silicate). The tube is filled with mercury vapor at extremely low pressure. FIG. 1 illustrates an exemplary fluorescent lamp 10. Excitation filaments F1 and F2 are placed at alternative ends of lamp 10 and are powered by an input alternating current voltage Vac. As can be seen in FIG. 1, input voltage Vac is applied at terminals 11 and 12. In the circuit shown in FIG. 1, the current limiting component is formed of a high value iron inductance L which is connected between terminal 11 and supply terminal 13 of filament F1. The second supply terminal 14 of filament F1 is connected to terminal 15 of filament F2 by way of a starter circuit 16 which is typically a thermal switch 19. Terminal 17 of filament F2 is connected to input terminal 12. A capacitor C interconnects power supply terminals 11 and 12.

A starter circuit 16 in the form of a thermal switch is used to heat up filaments F1 and F2 of lamp 10 by connecting together or otherwise short circuiting terminals 14 and 15 until the filaments F1 and F2 are no longer cold. The starter circuit 16 opens as soon as filaments F1 and F2 have reached a predetermined temperature. This will result in an over voltage which triggers or otherwise turns the fluorescent lamp 10 on by means of power stored as a result of inductance L.

Under normal operations, the function of inductance L is to limit the current in lamp 10 in order that it does not exceed the value for which it is designed. The function of capacitor C is to compensate for the dephasing associated with the inductive assembly in order to improve the power factor and to make lamp 10 acceptable for a connection to a network.

The disadvantages of the prior art circuit illustrated in FIG. 1 are inherent in its design. The design of the prior art illustrated in FIG. 1 is a conventional power system. The system uses a high inductor (e.g., 1 Henry) which will result in a structure which is cumbersome, bulky and heavy. Furthermore, the inductive nature of the assembly requires a capacitor C of high value (e.g., 10 $\mu$F) which necessitates use of a heavy electrolytic capacitor. The primary disadvantage of the prior art circuit shown in FIG. 1 is that it cannot be used to dim the light emitted from a fluorescent lamp.

Another control circuit disclosed by the prior art is illustrated in FIG. 2. FIG. 2 constitutes a conventional electronic circuit which employs active components to limit the current drawn by the fluorescent lamp. The circuit illustrated in FIG. 2 employs a diode bridge D having a pair of input terminals 20 and 21 which are connected to terminals 22 and 23, respectively, of input alternating current voltage Vac. By means of a high value electrolytic capacitor C, the output terminal 22 of bridge D provides a direct current power source to a switched-mode converter 23 which is used to supply fluorescent lamp 24. Switched-mode converter 23 is a conventional circuit generally formed by a control circuit 25 which is associated with two MOS power transistors M1 and M2 which are connected in series between terminal 22 of bridge D and the ground, capacitor C being connected in parallel thereto. The terminal 30 of the switched-mode converter 23 is connected to a first terminal of a high frequency inductance L which is then connected in series with input terminal 19 of filament F1 of lamp 24. A capacitor C2 of low value interconnects terminals 26 and 27 of filaments F1 and F2 and enhances the ability to trigger or otherwise start fluorescent lamp 10.

Terminal 28 of filament F2 is connected to ground through a capacitor C3. Another capacitor C4 connects terminal 28 of filament F2 to input terminal 29 of switched-mode capacitor C5. Capacitor C4 and C5 are used to filter the direct current component in fluorescent lamp 24. Terminal 29 receives the direct current voltage provided by capacitor C1. Transistor M1 is connected between terminals 29 and 30 and transistor M2 is connected between terminal 30 and ground. Transistors M1 and M2 are controlled by circuit 14 which also includes a feedback input connected to terminal 30 and which is supplied from terminal 29 through resistor R. A capacitor C5 interconnects terminals 29 and 30 and contributes to the generation of an auxiliary power supply necessary for the control of transistor M1.

The disadvantage of the prior art circuit illustrated in FIG. 2 is that, as in the circuit shown in FIG. 1, it requires electrolytic capacitors of high value (e.g., more than 10 $\mu$F) to filter the rectified voltage output at terminal 22. The use of electrolytic capacitors will result in the reduction of the life of the circuit. Another disadvantage of the circuit shown in FIG. 2 is that harmonics from the supplied current will affect the power factor in the absence of a correction circuit. As with the prior art circuit illustrated in FIG. 1, that shown in FIG. 2 cannot be employed for dimming the illumination of a fluorescent lamp.

The present invention substantially resolves the inadequacies inherent in the devices disclosed by the prior art. Principally, the present invention control circuit allows the illumination from a fluorescent lamp to be responsive to the input power and, most importantly, to permit illumination to commence at an input voltage which is less than that specified for the selected fluorescent lamp. The objectives of the present invention are achieved through the use of a half-wave voltage doubler circuit. The alternating current signal is processed to alter the sinusoidal form of the input alternating current power and apply voltage to the fluorescent lamp filaments only once per cycle. The effect of the present invention is to double the voltage that drives the fluorescent lamp. This will cause the fluorescent lamp to illuminate at a higher level and will permit the fluorescent lamp to be dimmed when the alternating current voltage input to the present invention is reduced even to that which is less than the minimum generally required for operation of the fluorescent lamp. When the input alternating current voltage is reduced, the light emitted from the fluorescent lamp will be reduced or dimmed accordingly.

SUMMARY OF THE INVENTION

The present invention comprises a control circuit or ballast for a fluorescent lamp which will permit the user to dim the illumination of the lamp. Rectified alternating current power is applied to a self-oscillating multi-vibrator circuit. The multi-vibrator circuit creates an oscillating, high frequency square wave which excites the resonant circuit. A sinusoidal voltage is magnified by the power factor at resonance. The voltage will increase until it reaches a sufficient amplitude to strike or otherwise start the operation of the fluorescent lamp.

The circuit driving the fluorescent lamp creates a half-wave voltage signal which is substantially double that of the input alternating current signal. By doubling the voltage of the input signal, the fluorescent lamp will illuminate at a brighter level and it will compensate for the illumination lost during the non-active portion of the signal. In addition, by doubling the voltage driving the lamp, the present invention circuit will cause the fluorescent lamp to commence operation at an input voltage which is lower than that specified for the fluorescent lamp.

It is an object of the present invention to provide an improved control circuit for dimming a fluorescent lamp.

It is another object of the present invention to provide a dimmable ballast for a fluorescent lamp which is compact.

It is still another object of the present invention to provide a dimmable ballast for a fluorescent lamp which incorporates a voltage-doubler circuit which permits operation of a fluorescent lamp at input voltages which are lower than that specified for the fluorescent lamp.

It is still yet another object of the present invention to provide a dimmable ballast for a fluorescent lamp which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

The present invention constitutes a control circuit or ballast which is used as a current limiting element necessary because of the structure of fluorescent lamps. A fluorescent lamps operates as a voltage limiting component, i.e., the voltage drop across the fluorescent lamp is independent of the input supply voltage. The fluorescent lamp ballast serves three functions. Firstly, it creates a voltage which is sufficiently high to start or otherwise turn the fluorescent lamp on. Secondly, the ballast limits the alternating current to the fluorescent lamp once it has been started. Thirdly, the ballast provides voltage to the filaments of the fluorescent lamp.

Figure 1:
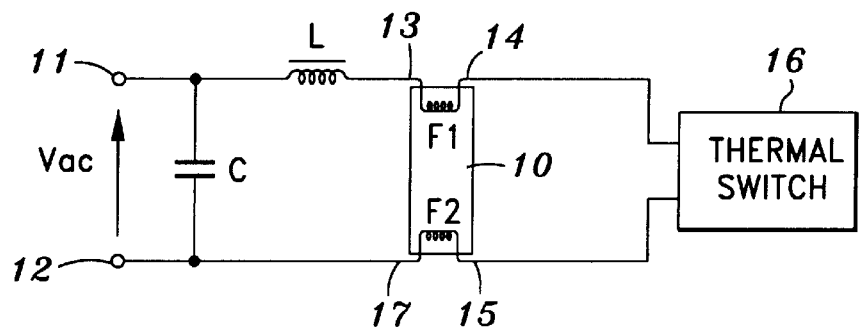
FIG. 1 is a first circuit disclosed by the prior art for controlling a fluorescent lamp.
Figure 2:
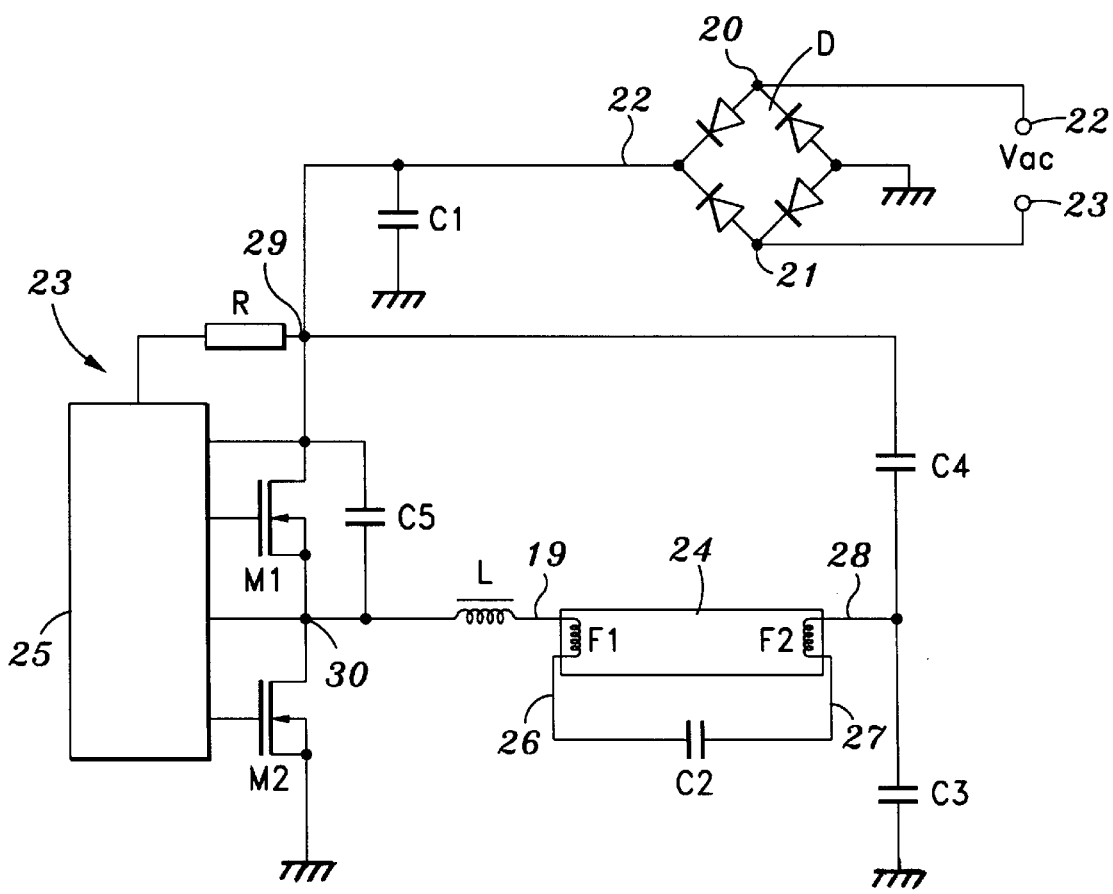
FIG. 2 is a second circuit disclosed by the prior art for controlling a fluorescent lamp.
Figure 3:
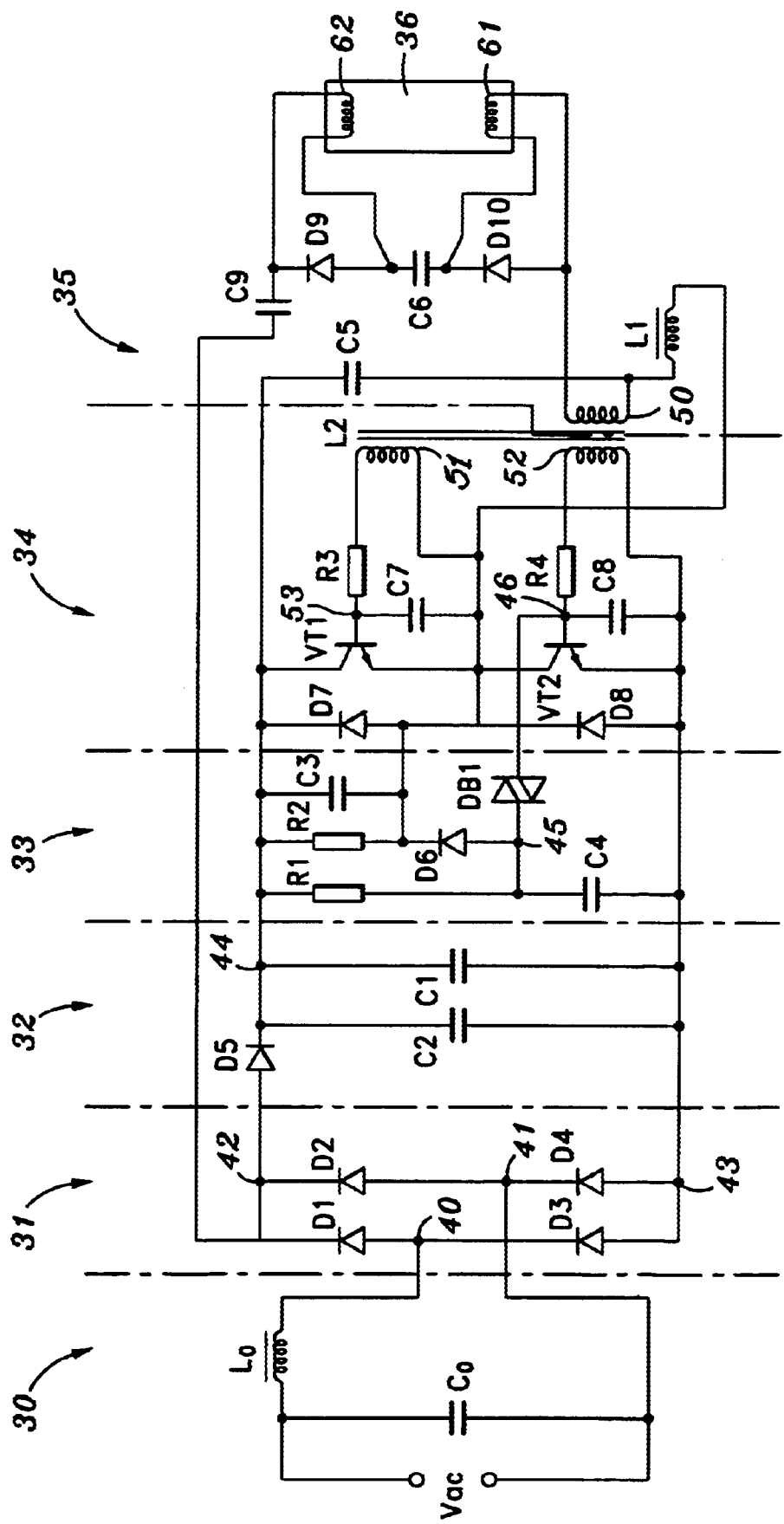
FIG. 3 illustrates an embodiment of a fluorescent lamp control circuit in accordance with the present invention.
Figure 4:
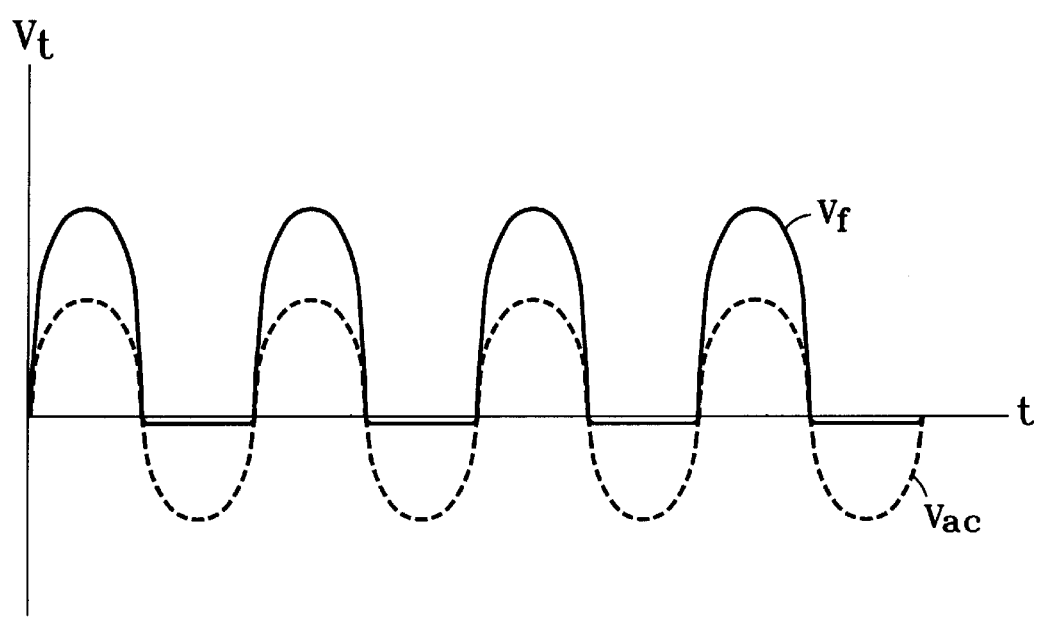
FIG. 4 illustrates a timing diagram of the signal driving a fluorescent lamp in accordance with the present invention.

An understanding of the preferred embodiment of the present invention can be best gained by reference to FIGS. 3 and 4. The electronic circuit shown in FIG. 3 may be divided into six segments. These consist of an electro-magnetic interference (i.e., an EMI) filter 30, a diode bridge rectifier 31, a direct current power filter 32, a starter circuit 33, a self-oscillation circuit 34 and an output voltage doubler and resonance circuit 35. As will be described in detail hereinbelow, a fluorescent lamp 36 is powered by the output voltage doubler 35.

The EMI filter 30 comprises an inductor $L_0$ and capacitor $C_0$. The filter permits 60 Hz low frequency alternating current power to pass into the circuit, while preventing internally generated high frequency electrical noise (i.e., electro-magnetic interference) from passing to and being superimposed back onto the main power source. Without EMI filter 30, electro-magnetic interference could interfere with conventional radio and television reception.

Diode bridge rectifier circuit 31 is a conventional circuit used to convert alternating current to direct current power. The output of inductor $L_0$ is connected to junction 40 between the cathode of diode D3 and the anode of diode D1. The return of the alternating current signal is connected to the interface 41 between the cathode of diode D4 and the anode of diode D2. Diode bridge circuit 31 performs a full wave rectification of the applied 120 Vac, 60 Hz signal. Full wave recitifcation separates the alternating current signal into positive and negative direct current components. The positive output 42 of the diode bridge is at the junction of the cathodes of diodes D1 and D2. The negative output 43 of the diode bridge circuit 31 is located at the junction of the anodes of diodes D3 and D4. This is conventionally understood to be the circuit "ground."

The direct current power filter 32 generally consists of capacitor C1 and C2 and diode D5. The positive output from diode bridge 31 is applied to the anode of diode D5. Diode D5 is used for passive power factor correction. Diode D5 restricts the flow of current in one direction. This permits current to flow into capacitor C1 and C2 for use as a circuit power supply while preventing the fluorescent lamp circuit from draining power. This also reduces the cyclical power drawn by the circuit resulting in a higher power factor.

Capacitors C1 and C2 comprise a direct current power filter. The output 44 of diode D5 is filtered by capacitors C1 and C2. Filtering removes the alternating current components resulting in a less volatile direct current voltage on which is superimposed a small alternating current component conventionally called "ripple." The present invention employs both capacitors C1 and C2 to filter high and lower frequencies which may be superimposed on the input power signal. Although the preferred embodiment of the present invention utilizes both capacitors C1 and C2, it is understood the scope of the present invention contemplates the use of a single capacitor.

Starter circuit 33 comprises resistors R1 and R2, capacitors C3 and C4, diode D6 and a bi-directional trigger diode (diac) identified as DB1. Diac DB1 is triggered from a blocking state to a conducting state for either polarity when the voltage amplitude of the applied signal exceeds a specified voltage. When diac DB1 is in the conducting state, it exhibits a negative resistance, i.e., the voltage drop across diac DB1 is reduced to a minimum state thereby creating a pulse. Resistors R1 and R2, capacitors C3 and C4 and diode D6 process the output signal appearing at junction 44. When power is first applied to the present invention circuit, the signal at the input 45 of DB1 will exceed the rating of diac DB1 putting it into the conducting state. The output of diac DB1 is applied to the base 46 of transistor VT2. As will be explained in detail hereinbelow, when transistor VT2 is turned on, a self-oscillation cycle will be initiated.

Diodes D7 and D8, transistors VT1 and VT2, resistors R3 and R4, capacitors C7 and C8 and transformer L2 comprise a self-oscillating multivibrator circuit 34. Resistors R3 and R4 limit the current at bases 53 and 46 of transistors VT1 and VT2, respectively. Capacitors C7 and C8 form a traditional RC filter with resistors R3 and R4 respectively. Filtering improves noise immunity and delays switching the respective transistor to a conducting state. Diodes D7 and D8 protect transistors VT1 and VT2 respectively by limiting the transformer flyback voltage that would otherwise occur when the transistors are switched to the non-conducting state The primary winding 50 of transformer L2 is connected in series with filament 61 of fluorescent lamp 36, inductor L1 and capacitor C5. Transformer L2 has two secondary windings 51 and 52 which are 180° out-of-phase with each other and which are adapted to drive base 53 of transistor VT1 and base 46 of transistor VT2, respectively. Since the output of secondary windings 51 and 52 are 180° out of phase with each other, when one transistor is conducting, the other is in a non-conducting state.

The conduction of transistor VT2 allows positive current in inductor L1, voltage doubler circuit 35 and primary winding 50 of transformer L2. When current flows in primary winding 50 of transformer L2, it creates a positive voltage across the secondary winding 52 which drives base 46 of transistor VT2. This causes transistor VT2 to stay in a conducting state until the current in primary winding 50 ceases. The current will cease when capacitors C6 and C9 in voltage doubler and resonance circuit 35 are fully charged. When this occurs, inductor L1 discharges causing current to flow in primary winding 50 of transformer L2. This produces a negative voltage at the base 46 of transistor VT2 turning the transistor off while simultaneously generating a positive voltage across secondary winding 51 of transformer L2 thereby driving the base 53 of transistor VT1 and switching transistor VT1 to a conducting state.

When transistor VT1 is in a conducting state, negative current will flow through inductor L1, voltage doubler and resonance circuit 35 and the primary winding 50 of transformer L2. When current flows in primary winding 50, it generates a positive voltage across the secondary winding 51 which drives base 53 of transistor VT1. This will cause transistor VT1 to remain in the conducting state until current stops flowing in primary winding 50. As described hereinabove, current will cease flowing when capacitors C6 and C9 and voltage doubler circuit 35 are fully charged. When fully charged, inductor L1 will discharge causing current to flow in primary winding 50 of transformer L2 in the opposite polarity. This will produce a negative voltage at the base 53 of transistor VT1 turning it off while simultaneously generating a positive voltage on secondary winding 52 which drives the base 46 of transistor VT2 into a conducting state. Transistors VT1 and VT2 will continue to conduct alternatively (i.e., self-oscillation) controlled by the secondary u windings 51 and 52 of transformer L2. The primary winding 50 of transformer L2 is controlled by the current in voltage doubling circuit 35 operating at its resonant frequency.

In general, resonance occurs in an alternating current circuit when an inductor and a capacitor are connected in series with one another and, when activated, the signal frequency is such that the inductive reactance is equal to the capacitive reactance. At resonance, the voltage across the capacitor increases to a voltage higher than the applied voltage. This is generally referred to as the quality factor Q. The quality factor Q is the measure of the rate at which energy is dissipated in the circuit if the alternating current voltage source across the series circuit is removed. At resonance, the voltage across the capacitor is approximately the product of the applied alternating current voltage and the quality factor Q of the circuit.

Output voltage doubler and resonance circuit 35 comprises inductor L1, capacitors C5, C6 and C9, the primary winding 50 of transformer L2, diodes D9 and D10 and fluorescent lamp 36. After transistor VT2 is initially placed in the conducting state, oscillation is sustained and a high frequency square wave of approximately 50 KHz excites the resonance portion of the circuit. A sinusoidal voltage is created across capacitor C6 which is magnified by the quality factor Q at resonance. This voltage across capacitor C6 increases until it develops sufficient amplitude to strike or otherwise turn on fluorescent lamp 36. Before fluorescent lamp 36 strikes, the resonant frequency is controlled primarily by the inductance of inductor L1 and transformer L2 and capacitors C5, C6 and C7, all of which are in series. Capacitor C9 is for direct current blocking with a low reactance so that the resonant circuit is effectively inductor L1 and capacitors C5 and C6. After the lamp strikes, capacitor C6 is effectively short circuited by the voltage drop across fluorescent lamp 36 and the resonant circuit now depends upon inductor L1 and capacitor C5.

The output doubling circuit 35 consists of capacitor C9 and diodes D9 and D10. Diodes D9 and D10 by-pass lamp filaments 61 and 62 during one half of the sine wave cycle when positive current flows in a direction of the anodes of diodes D9 and D10. During the portion of the cycle that voltage would normally be dissipated across lamp filament 61 and 62, the current in diodes D9 and D10 is used to charge capacitors C6 and C9. Without diodes D9 and D10 bypassing lamp filaments 61 and 62, fluorescent lamp 36 would be driven by a sinusoidal wave VAC (See FIG. 4) which illuminates the lamp first with positive voltage and then with negative voltage. With diodes D9 and D10 in parallel with filaments 61 and 62, respectively, fluorescent lamp 36 will illuminate only once per cycle.

During the non-illuminating period of the cycle, diodes D9 and D10 will be biased into a conducting state and thereby charge capacitors C6 and C9 to the peak voltage amplitude of the applied sinusoidal wave. During the illuminating portion of the cycle, the charge stored in capacitors C6 and C9 is applied in series with the power to lamp 36. This will result in a doubling of the output voltage $V_f$ that drives the filaments 61 and 62 of fluorescent lamp 36 (See FIG. 4). The doubling of the voltage applied to filaments 61 and 62 will cause fluorescent lamp 36 to illuminate at a higher intensity level which will be sustained during the loss of half of the duty cycle $V_f$. This also permits fluorescent lamp 36 to operate with an applied alternating current voltage which is one half of that normally required to strike the lamp.

In order for fluorescent lamp 36 to illuminate, the voltage across filaments 61 and 62 must be greater than the minimum voltage specified. When maximum line voltage is applied (i.e., 120 VAC), the illumination of fluorescent lamp 36 will be maximized. When the applied alternating current voltage is reduced, the brightness of fluorescent lamp 36 will be reduced until the voltage drop across fluorescent lamp 36 drops below the minimum voltage required for strike. Therefore, the present invention circuit allows the intensity of the illumination of fluorescent lamp 36 to be variable (i.e., dimmed) when the applied voltage is reduced to approximately half thereby yielding an operating voltage in the range of 60–120 VAC.

I claim:

1. A control circuit for varying the intensity of illumination of a fluorescent lamp having first and second filaments comprising:
   (a) a DC supply for rectifying a low frequency alternating supply voltage having first and second rectified voltage terminals;
   (b) a triggerable pulse source connected between the first and second rectified voltage terminals of the DC supply, said pulse source being triggered from a blocking state to a conducting state when the amplitude of the applied supply voltage exceeds a predetermined voltage;
   (c) a self-oscillating multi-vibrator connected to the pulse source adapted to provide energy at the resonant frequency of said control circuit; and
   (d) an output voltage doubler including at least one inductive element to provide an alternating current voltage output to the fluorescent lamp which is substantially greater than the supply voltage, said output voltage doubler including first and second diodes connected across the first and second filaments of the fluorescent lamp, respectively, and in being series with said inductive element.

2. A control circuit as defined in claim 1 wherein said DC supply is the full wave bridge rectifier having four diodes.

3. A control circuit as defined in claim 2 wherein said triggerable pulse source is characterized by a bi-directional trigger-diode responsive to the output of said bridge rectifier.

4. A control circuit as defined in claim 3 wherein said self-oscillating multi-vibrator is characterized by first and second transistors, said first transistor being connected to said trigger diode, the conducting states of said first and second transistors being 180° out of phase with one another.

5. A control circuit as defined in claim 4 wherein a flyback protection diode is connected in parallel to each of said first and second transistors.

6. A control circuit as defined in claim 1 wherein the first and second filament of the fluorescent lamp are in series with a charging capacitor and the diode connected in parallel to each of said first and second filaments whereby said capacitor is charged to peak voltage amplitude.

* * * * *